July 28, 1953 — J. C. NEWTON — 2,646,946
AUTOPILOT
Original Filed Nov. 27, 1945
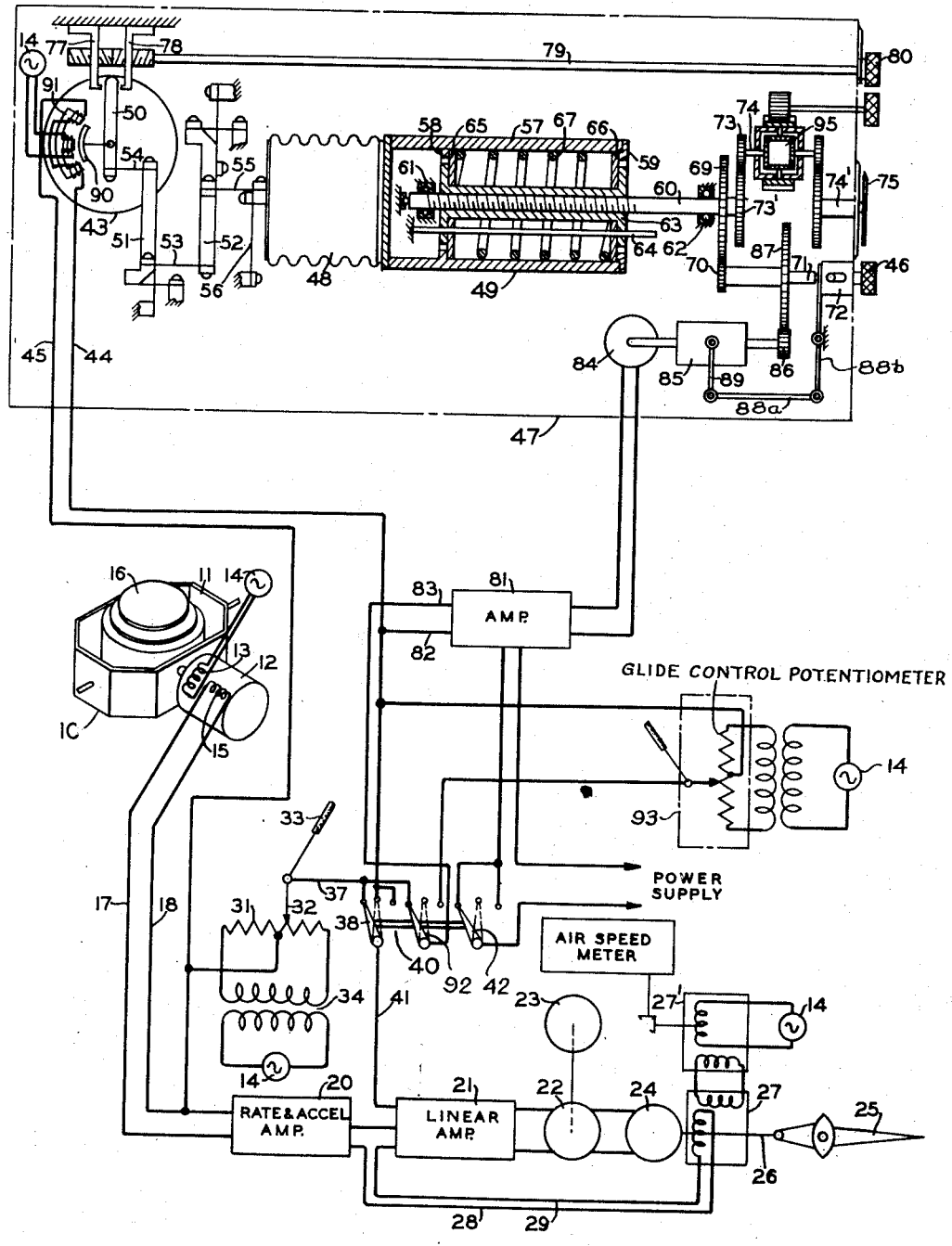
INVENTOR
JOHN C. NEWTON
BY
*his* ATTORNEY Patented July 28, 1953

2,646,946

UNITED STATES PATENT OFFICE 2,646,946

AUTOPILOT

John C. Newton, Roslyn Heights, N. Y., assignor to The Sperry Corporation, a corporation of Delaware Continuation of application Serial No. 631,077, November 27, 1945. This application October 10, 1950, Serial No. 189,437

20 Claims. (Cl. 244—77)

This invention relates to autopilots for dirigible craft and particularly concerns an autopilot of the character connected to operate the elevators of the craft to control the altitude thereof.

The present application is a continuation of application S. N. 631,077 which was filed in the U. S. Patent Office on November 27, 1945, now abandoned.

In heretofore known types of controllers of this character, an autopilot operating pick-off was provided in an operative connection that included an aneroid bellows and a manually settable altitude knob. With such an arrangement, the human pilot changed the altitude of the craft by gradually moving the control knob to the setting indicating the desired altitude. This was necessary in order to prevent the bellows from becoming overstrained and in order to prevent the pitch attitude angle of the craft from changing too rapidly or from exceeding predetermined limits until the craft reached the desired altitude. In accordance with the present invention, an altitude controller for an autopilot is provided whose manually operable control knob can be immediately moved to the desired altitude setting by the human pilot.

One of the features of the invention resides in the inclusion of an overtravel device in the connection between the pick-off of the autopilot and the manually settable altitude knob that prevents overstraining of the aneroid bellows.

A further feature of the invention resides in the provision of a stop means with the controlling connection that limits the output of the pick-off of the autopilot so that the elevators of the craft do not move the craft to assume more than a desired pitch attitude. This insures that the rate of ascent or descent of the craft is maintained within safe limits.

An object of the present invention resides in providing an aircraft control device of the foregoing character comprising an aneroid bellows and a signal generating pick-off operated thereby together with an altitude control element and a motion transmission system connecting the altitude control element, aneroid bellows and signal generating pick-off, said device further including means for limiting the degree of deformation that may be imposed on the bellows when the setting of the altitude control would otherwise do so.

Still another object resides in providing an aircraft control device of the foregoing character in which an over-travel device is embodied in said device for the purpose of preventing damage to the aneroid bellows.

Another object resides in providing a device generally of the foregoing character in which a servomechanism is controlled by the signal derived from the signal generating pick-off and said servomechanism is connected to control the pressure responsive device or aneroid bellows in such manner as to cause the signal output of the pick-off to reduce toward zero.

Still other objects reside in providing altitude controls for aircraft which are generally of the foregoing characters but in which additional means are provided for limiting the angle through which the pitch attitude of the craft may be varied when a change in altitude is set in; and still other objects of my invention will be apparent from the following description thereof although not at this point specifically referred to.

Other features and structural details of the invention will be apparent from the following description when read in relation to the accompanying drawing, wherein the single figure is a schematic view and wiring diagram of an elevator operating autopilot with the improved altitude controller embodied therein.

With reference to the drawing, an autopilot constructed in accordance with the present invention may include a gyrovertical as indicated at 10 whose ring 11 is provided with a pitch axis pick-off 12. As shown, pick-off 12 is a selsyn device whose rotor winding 13 is energized from a suitable source 14 of alternating current. The rotor winding 13 is mounted to move with the rotor case 16 of the gyro-vertical so that the pick-off provides an output when the craft tilts about its athwartship axis whose amplitude is dependent upon the degree of tilt and whose phase is dependent upon the direction of tilt. The stator winding of the selsyn device is indicated at 15. Leads 17 and 18 carry the output signal of the pick-off 12. The described portion of the autopilot is conventional and is included herein in order to show a complete autopilot structure of the character claimed.

The autopilot, as shown, may also include a rate and acceleration amplifier as indicated generally at 20 that receives the output of the pick-off 12. The output of amplifier 20 is shown as fed to a suitable linear amplifier 21 that in turn energizes the field winding (not shown) of a generator 22 whose armature is driven at a constant speed by a motor 23. The output of generator 22 is fed to an electric servomotor 24 that is operatively connected to the elevators 25 of the craft by a suitable shaft 26. In the illustrated autopilot, a device for measuring the movement of shaft 26 may be incorporated in the system. The system may also include a device for measuring the air speed of the craft. These respective devices may be a pair of selsyn instruments as indicated at 27 and 27', one of whose rotors is controlled by an air speed meter and the other of whose rotors is driven from shaft 26. The output of the instruments, as shown, may be fed by way of leads 28 and 29 to the linear amplifier 21 in opposition to the signals supplied the same from amplifier 20 and by way of lead 41. The described autopilot parts, such as the amplifiers, the servomotor and the feedback circuit are particularly shown in Fig. 7 of application Serial No. 485,546, filed May 3, 1943, which application issued as U. S. Patent No. 2,511,846, issuing on June 20, 1950, in the name of Percy Halpert and being assigned to the assignee of the present invention and per se form no part of the present invention.

In order to properly control the craft so the same assumes different pitch attitudes, the displacement signal of pick-off 12 is fed to the linear amplifier 21 by way of a trimming circuit that includes potentiometer 31, the movable arm 32 of which is set by a manual control knob 33. Knob 33 is set so as to correct the autopilot for a given load, load distribution and air speed of the craft. As shown, the source 14 energizes the center-tapped potentiometer 31 by way of transformer 34. The arm 32 of the potentiometer is connected to the linear amplifier 21 by way of lead 37, arm 38 of a triple-pole triple-throw switch 40 and lead 41. With arm 38 in the position shown in the drawing, a complete autopilot is indicated without the altitude controller forming the subject matter of the present invention. The second arm of switch 40 is indicated at 42. The third arm of switch 40 is indicated at 92.

The improved altitude controller is incorporated in the autopilot by throwing switch 40 to the central position as viewed in the drawing, so that the arms thereof assume the position in which they are illustrated in dotted lines. When switch 40 is so positioned, the pitch trim potentiometer 31 is disconnected and a second pick-off indicated at 43 is included in series with the pick-off 12 to feed the linear amplifier 21 of the autopilot. Pick-off 43 may be a three-legged transformer type device of the character shown and described in the copending application of Jack C. Wilson, Serial No. 495,170, filed July 17, 1943, which application issued on May 6, 1947 as U. S. Patent No. 2,419,979 and said patent being assigned to the assignee of the present invention. The armature and wound stator of the pick-off are respectively indicated at 90 and 91. Stator 91 is energized from source 14 and the output of the pick-off is fed to leads 44 and 45. Lead 45 connects with lead 18 and lead 44 connects with lead 41 when arm 38 of the switch 40 is in its dotted line position. The altitude controller pick-off 43 has two relatively movable parts that provide an output signal effective to operate the servo means or motor 24 of the autopilot. This operating signal is supplied to the autopilot amplifier 21 by way of lead 41, switch arm 38 and lead 44.

The controller further includes a manually settable altitude control knob or element indicated at 46. As shown, the altitude controller parts are situated in a housing whose outline is indicated at 47. Knob 46 extends exteriorly of the housing at a position in the front face of the same where it is readily accessible to the human pilot. In accordance with the invention, means are provided for operatively connecting the control knob 46 and the rotor of the pick-off 43. As shown, this means is a linkage system that includes an aneroid bellows 48 and an overtravel device 49. The system further includes an arm 50 that moves the armature 90 of the pick-off 43 when the control knob is moved. As shown, the linkage system provides two spring pivoted normally parallel arms 51 and 52 that are connected by flat spring 53. Flat spring 54 connects arm 51 and the movable arm 50. One end of the aneroid bellows is connected to the arm 52 by a flat spring 55. A vertical spring 56 is connected to support one end of the bellows 48. The arrangement of this portion of the linkage within the housing is such as to normally position arm 50, so that the pick-off 43 normally produces a null output. With displacement of the horizontal spring 55 to the right or left as viewed in the drawing, the arms of the linkage are moved correspondingly to move the armature of the pick-off 43. The described portion of the linkage system is self-centralizing so that when the force causing the displacement of spring 55 is removed, the arm 50 automatically returns to its normal position.

An opening (not shown) is provided in the housing of the controller, so that the aneroid bellows is responsive to atmospheric pressure changes.

The connection between the pick-off 43 and knob 46 includes an overtravel device having a hollow cylindrical casing 57 fixed to the right-hand end of the aneroid bellows. The construction of the device shown in the drawing indicates that the casing has an internal flange 58 and an end flange plate 59 that is fixed to the casing in a suitable manner. The other end of the overtravel device includes a threaded rod 60 that is rotatably mounted by means of bearings 61 and 62. A spool shaped piece 63 meshes with the rod 60 and is moved axially thereby. A pin 64 fixed in the casing 57 engages the piece 63 to prevent the same from rotating with rod 60 and to insure that the piece moves in an axial direction either toward the right or left as viewed in the drawing when rod 60 is turned. Translatory motion is communicated between the parts of the overtravel device by the cylindrical plates 65 and 66 with the compression spring 67 therebetween. Plate 65, as shown, normally engages the inside wall of flange 58 and the inside left wall of the spool shaped piece 63. Similarly, plate 66 normally engages the inside wall of flange plate 59 and the inside right wall of the spool shaped piece 63. Rod 60 is connected to the knob 46 by way of gear 69, gear 70, shaft 71 and slide connection 72.

Casing 57 and spool shaped piece 63 constitute a pair of elements of the motion transmitting system connecting the altitude control knob 46 with aneroid bellows 48 and pick-off 43 while spring 67 serves to impart movement from one of these elements to the other. Actually, the overtravel device 49 functions as an energy-storage means in that it stores up energy in spring 67 when a comparatively large change in the desired altitude is set in by means of knob 46. Assuming that the total change so set in would be sufficient to apply excessive strains to the bellows if applied thereto, device 49 operates to impart only a fractional portion of the necessary adjustment to the bellows and stores up energy to be thereafter used without straining the bellows in further setting the bellows in accordance with the initial value set in by knob 46.

Gear 73 meshing with gear 73' on rod 60 drives a shaft 74 to position an altitude indicating pointer 75, situated on the exterior of the housing 47. Gears 73 and 73' may be of the elliptical or other variable ratio type to compensate for the non-linear relation between bellows length and altitude. A suitable altitude scale (not shown) fixed to the housing may provide the reference on which the pointer 75 is read. A differential 95 adjusts the pointer for changes in barometric pressure at sea level, as set in by knob 95'.

The altitude controller further includes means for limiting the output signal of the pick-off 43 to prevent the operation of the autopilot to an extent such that the elevators would move the craft to greater than a desired angle of pitch attitude. This is accomplished in the present instance by a stop means for limiting the extent of movement of the armature of pick-off 43 by knob 46. As shown in the drawing, a pair of oppositely movable limit pieces 77 and 78 cooperate with arm 56 of the linkage system in this connection. The spacing of the pieces 77 and 78 may be adjusted to permit more or less motion of arm 50 as desired by rod 79 and the manually settable knob 80.

With the altitude controller in operation in the autopilot, the human pilot changes altitude by moving knob 46 until the dial 75 is properly set at the desired altitude. This operation can be effected immediately because of the overtravel device and the stop means, the first of which enables the knob to be turned as desired without overstraining the bellows 48 and the second of which prevents the autopilot from operating with more than a predetermined angle of pitch attitude. In operation, as the knob 46 is turned, the rod 60 rotates to cause translation of the spool piece 63. This moves the whole linkage system to the left or right depending on the direction that knob 46 is turned and moves arm 50 of pick-off 43 to operate the autopilot. Spring 67 of the overtravel device is sufficiently weak as not to overload the bellows 48 so that spool piece 63 can be moved to the right or left to a greater extent than the casing 57. When this occurs, the spring 67 is compressed by more than a normal amount until restored by the change in length of the aneroid bellows as the craft reaches the desired altitude. In the linkage shown, the overtravel device is situated in a position between the aneroid bellows and the control knob. Also, the aneroid bellows is shown in a position between the overtravel device and the pick-off. The particular arrangement of bellows, control knob and overtravel device described in the foregoing is to be understood as merely illustrative and other relative arrangements thereof may be employed.

When switch 40 is set so that the arms 38 and 42 thereof are in the full line position, the altitude controller is rendered ineffective to control the autopilot. In order to insure that the controller is properly conditioned to be included in the autopilot at any time, without causing a sudden change in altitude, the output of the pick-off 43 together with that of trim controller 31, 32 is fed to an amplifier 81 by way of leads 82 and 83. Amplifier 81 is connected to a power supply through arm 42 of switch 40 so that when the controller is included in the autopilot, the line to the supply is broken. When the arms of the switch 40 are positioned as indicated by the full lines, arm 42 closes the circuit between the amplifier 81 and its power supply. Leads 82 and 83 respectively connect with leads 44 and 37. The output of amplifier 81 is fed to a motor indicated at 84 that drives rod 60 and knob 46 through clutch 85 and gears 86 and 87, the last of which is situated on shaft 71. Clutch 85 provides a means for operatively connecting motor 84 and knob 46. Means are further provided in the form of the linkage system including pivoted arms 89, 88a and 88b for disconnecting the clutch 85 when the knob 46 is manually actuated. With this follow-up system, the dial 75 provides a continuous indication of the altitude of the craft as the system is controlled by the aneroid bellows 48. When switch 40 is operated to include the altitude controller in the autopilot, pick-off 43 is at its proper position to cause level flight until a change in altitude of the craft is set in by the control knob 46. Dial 75 will continue to show the correct altitude, since when the automatic pilot is in operation, the craft is kept at the indicated altitude, and when it is not, follow-up motor 84 positions the dial.

With the switch 40 thrown to its extreme right position in the drawing, the signal input to the autopilot still includes the output of the altitude control pick-off 43 and the follow-up motor amplifier 81 is also reenergized. In this position, the input of amplifier 81 and therefore of motor 84 is derived from a manually settable glide control potentiometer indicated at 93. By controlling potentiometer 93, the motor 84 may be controlled in speed and direction to control the movement of bellows 48 at a rate of change desired for the rate of change of altitude of the craft.

Although in the foregoing I have described a specific embodiment of my invention, it is to be understood that my invention, in its broader aspects, is inclusive of all types of instruments in which a pressure-responsive device, comprising a bellows and signal generating pick-off operated thereby, is employed and wherein one of the purposes of the arrangement is to prevent damage occurring to the bellows or pick-off through the operation of the mechanisms operatively associated therewith.

As many changes could be made in the above construction and any apparently widely different embodiments of this invention could be made without departing from the scope thereof, it is intended that all matter contained in the above description or shown in the accompanying drawings shall be interpreted as illustrative and not in a limiting sense.

What is claimed is:

1. An autopilot for dirigible craft including servo means operatively connected to the elevators of the craft, a manually settable altitude control knob, a pick-off providing an output signal to operate said servo means, means operatively connecting said knob and pick-off including an aneroid bellows and an overtravel device, and means for limiting the output signal of the pick-off, said limiting means and overtravel device permitting the setting of the knob to be changed as desired without obtaining more than a predetermined angle of pitch attitude of the craft and without damaging the aneroid bellows.

2. An autopilot for dirigible craft including servo means operatively connected to the elevators of the craft, a manually settable altitude control knob, a pick-off having two relatively movable parts providing an output signal to operate said servo means, means operatively connecting said knob and one of the parts of said pick-off including an aneroid bellows and an overtravel device, and stop means determining the extent of operation of the pick-off to prevent the output thereof from exceeding a desired limit, said stop means and overtravel device permitting the setting of the knob to be changed as desired without obtaining more than a predetermined angle of pitch attitude of the craft and without damaging the aneroid bellows.

3. An autopilot for dirigible craft including servo means operatively connected to the elevators of the craft, a manually settable altitude control knob, a pick-off having two relatively movable parts providing an output signal to operate said servo means, a linkage system connecting said knob and the movable part of said pick-off including an aneroid bellows and an overtravel device, and stop means for determining the movement of the movable part of the pick-off to prevent the output thereof from exceeding a desired limit, said stop means and overtravel device permitting the setting of the knob to be changed as desired without obtaining more than a predetermined angle of pitch attitude of the craft and without damaging the aneroid bellows.

4. An autopilot as claimed in claim 3, in which said overtravel device is situated in the linkage system in a position between the aneroid bellows and the control knob.

5. In an elevator controlling autopilot, the combination of an autopilot operating pick-off, a settable altitude element, means operatively connecting said element and pick-off including an aneroid bellows and an overtravel device, and means for limiting the movement of said pick-off by said element through said operative connection.

6. In an elevator controlling autopilot, the combination of an autopilot operating pick-off having two relatively movable parts, a manually settable altitude knob, a linkage system connecting said knob and one of the parts of said pick-off including an aneroid bellows and an overtravel device, and stop means for determining the movement of the movable part of said pick-off by said settable knob through said system.

7. In an elevator controlling autopilot, the combination of a pick-off providing an output signal to control the operation of the autopilot, a control element, means operatively connecting said element and pick-off including an overtravel device, and stop means for determining the output of said pick-off to prevent the angle of pitch attitude of the craft from exceeding a desired limit.

8. An altitude controller for autopilots comprising a manually settable knob, a pick-off providing an output, means operatively connecting said pick-off and knob including an aneroid bellows, a motor driven by the output of said pick-off, means operatively connecting said motor and said knob and means for disconnecting said motor and knob connecting means when the knob is manually actuated.

9. An altitude controller for autopilots comprising a manually settable knob, a pick-off providing an output, a linkage system connecting said pick-off and knob including an aneroid bellows and an overtravel device, a motor driven by the output of said pick-off, means operatively connecting said motor and knob, and means for disconnecting said motor and knob connecting means when the knob is manually actuated.

10. A controller as claimed in claim 9, including means for limiting the output of said pick-off.

11. A controller as claimed in claim 9, in which the aneroid bellows is situated in said linkage system in a position between said overtravel device and said pick-off.

12. In an aircraft autopilot operable to control the craft about its pitch axis, a barometric device operable to govern the altitude of the craft through said autopilot, a first signal generator controlled by said device for supplying a signal on departure of the craft from a predetermined altitude, a second signal generating means for trimming the craft at will through said autopilot, means for transferring the control of the autopilot from the second to the first of said generators, a motor, means for operatively connecting said motor to set said barometric device, and means for controlling said motor in accordance with the signal output of said first signal generator when said first signal generator is ineffective in the autopilot, and means for controlling said motor in accordance with the algebraic sum of the outputs of said two signal generators in a direction to reduce the algebraic sum of said signals to zero whereby sudden changes of altitude and trim of the craft are prevented when said transferring means is operated.

13. In an aircraft autopilot operable to control the craft about its pitch axis, a barometric device operable to govern the altitude of the craft through said autopilot, a first signal generator controlled by said device, a motor, means for operatively connecting said motor to set said barometric device, and means for controlling said motor in accordance with the signal output of said first signal generator to drive said motor in a direction to reduce the output of said first signal generator towards zero, means for rendering the device effective in controlling said autopilot and for removing control of said signal generator over said motor, means for generating a second signal of variable selected magnitude, and means for controlling the velocity of said motor in accordance with the magnitude of said second signal when said device is rendered effective to control said autopilot whereby the altitude of the craft may be changed at a desired rate.

14. In an aircraft control device, the combination with an altimeter comprising an aneroid bellows and a signal-generating pick-off operated thereby, of an altitude control element for setting said altimeter to desired values, a motion transmission system connecting said altitude control element, aneroid bellows and signal generating pick-off, and means connected in said transmission system for limiting the degree of deformation that may be imposed on said bellows when the setting of said altitude control would otherwise do so.

15. An altitude controller for autopilots comprising an input element for setting in altitude, a pick-off providing a signal output, means operatively connecting said pick-off and input element including an aneroid bellows, a motor and means for controlling said motor by the output of said pick-off, means operatively connecting said motor and said input element, and means for disconnecting said motor and input element-connecting means when said input element is actuated.

16. In an aircraft control system, the combination with a pressure-responsive means comprising a bellows and a signal-generating pick-off operated thereby, of an altitude control element for setting said means to desired values of pressure at which the signal output of said pick-off will be zero, a motion transmission system connecting said altitude control element, bellows and signal generating pick-off, and an overtravel device comprising a pair of relatively movable elements connected in motion transmitting relation in said system and resilient means for imparting movement from one of said elements to the other.

17. In an aircraft control system, the combination with a pressure-responsive device comprising a bellows and a signal generating pick-off operated thereby, of a servo mechanism controlled by the signal voltage derived from said pick-off for actuating said pressure-responsive device in a manner to cause the signal output of said pick-off to reduce toward zero, and means for limiting the degree of deformation that may be imposed on said device by said servo mechanism.

18. The combination defined in claim 17 together with input means operatively connected with said bellows for setting said device to desired values of pressure at which the signal supplied by the pick-off will be substantially zero.

19. In an aircraft control system, the combination with a pressure-responsive device comprising a bellows and a signal generating pick-off operated thereby, of a servo mechanism controlled by the signal voltage derived from said pick-off for actuating said pressure-responsive device in a manner to cause the signal output of said pick-off to reduce toward zero, and an over-travel device operatively connected with said bellows for preventing excessive strains being imposed on said device by said servo mechanism.

20. In an aircraft control system, the combination with a pressure-responsive device comprising a bellows and a signal generating pick-off operated thereby, of a servo mechanism controlled by the signal voltage derived from said pick-off for actuating said pressure-responsive device in a manner to cause the signal output of said pick-off to reduce toward zero, and energy-storage means operatively connected with said bellows for limiting the degree of deformation that may be imposed on said device by said servo mechanism.

JOHN C. NEWTON.

References Cited in the file of this patent

UNITED STATES PATENTS

| Number | Name | Date |
|---|---|---|
| 2,415,429 | Kellogg et al. | Feb. 11, 1947 |
| 2,446,546 | Weston | Aug. 10, 1948 |
| 2,474,618 | Divoll | June 28, 1949 |
| 2,489,073 | Bauman | Nov. 22, 1949 |